G. W. LUMM.
SOIL TILLER.
APPLICATION FILED APR. 27, 1918. RENEWED AUG. 4, 1919.
1,316,625.
Patented Sept. 23, 1919.
7 SHEETS—SHEET 2.
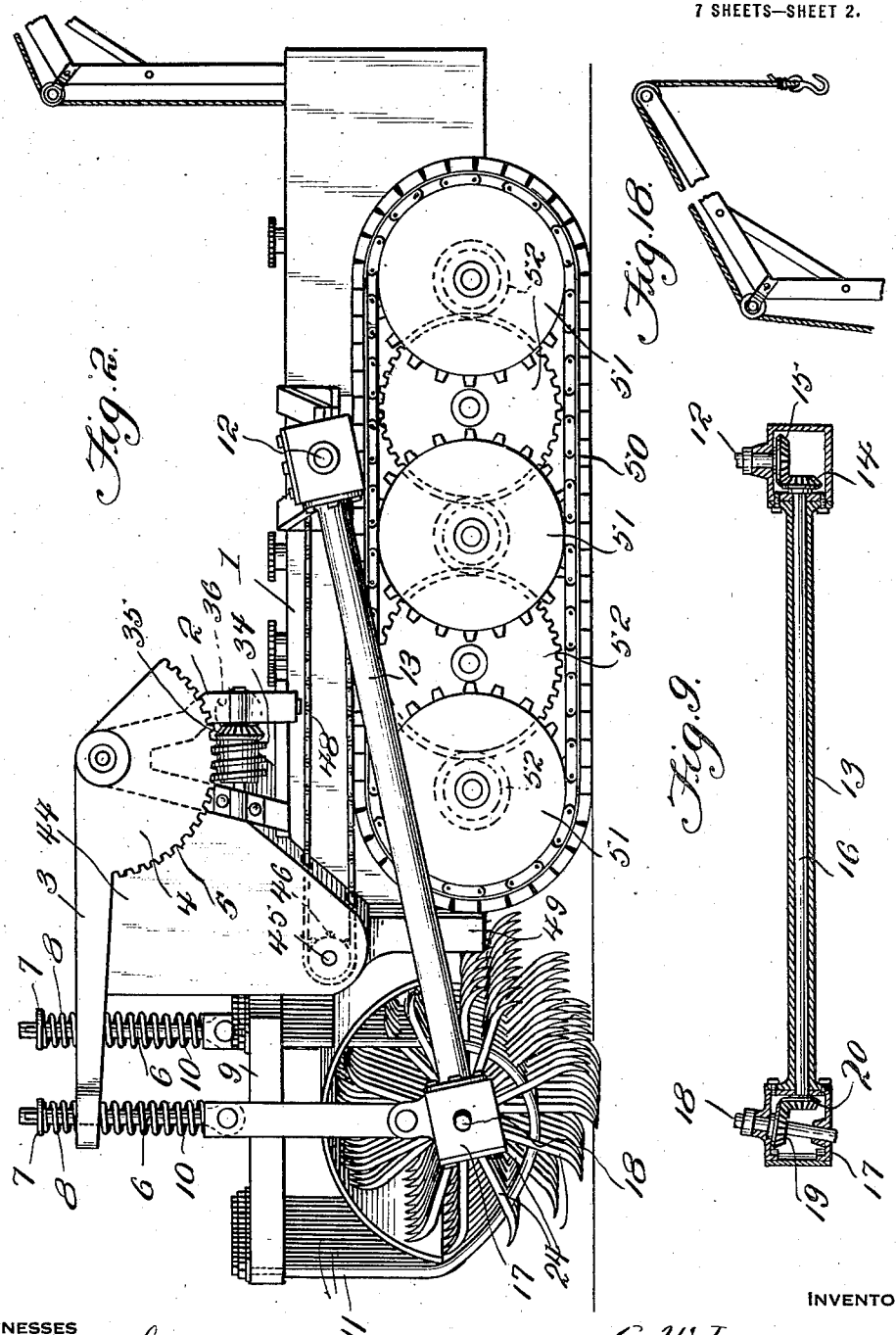
WITNESSES
J. L. Wright
INVENTOR
G. W. Lumm
BY Victor J. Evans
ATTORNEY G. W. LUMM.
SOIL TILLER.
APPLICATION FILED APR. 27, 1918. RENEWED AUG. 4, 1919.
1,316,625.
Patented Sept. 23, 1919.
7 SHEETS—SHEET 3.
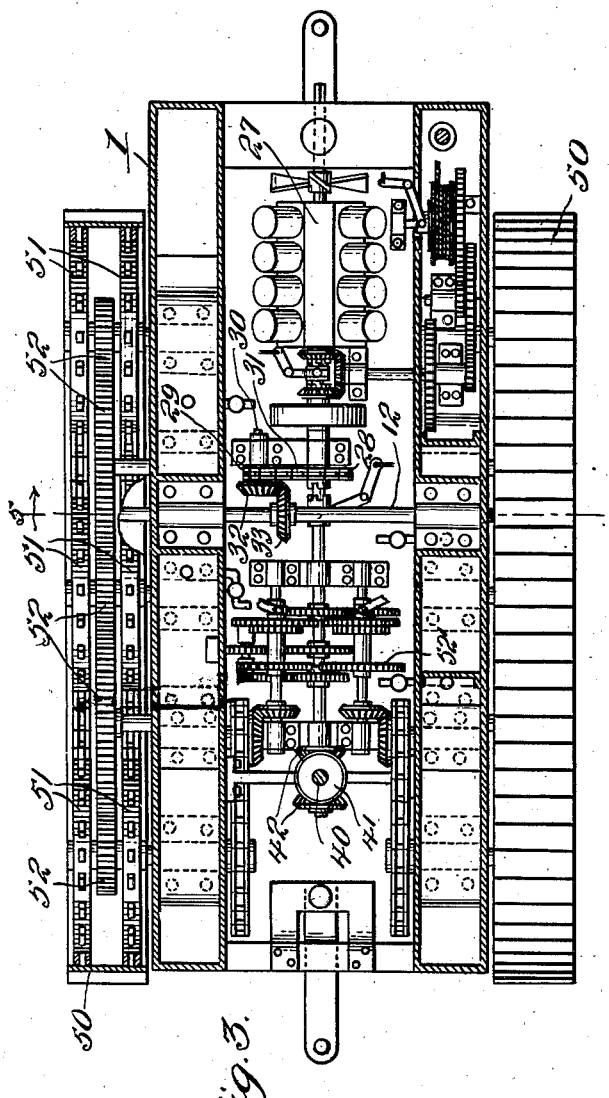
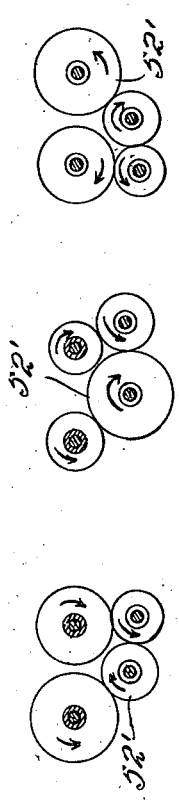
WITNESSES
INVENTOR
G. W. Lumm
BY Victor J. Evans
ATTORNEY

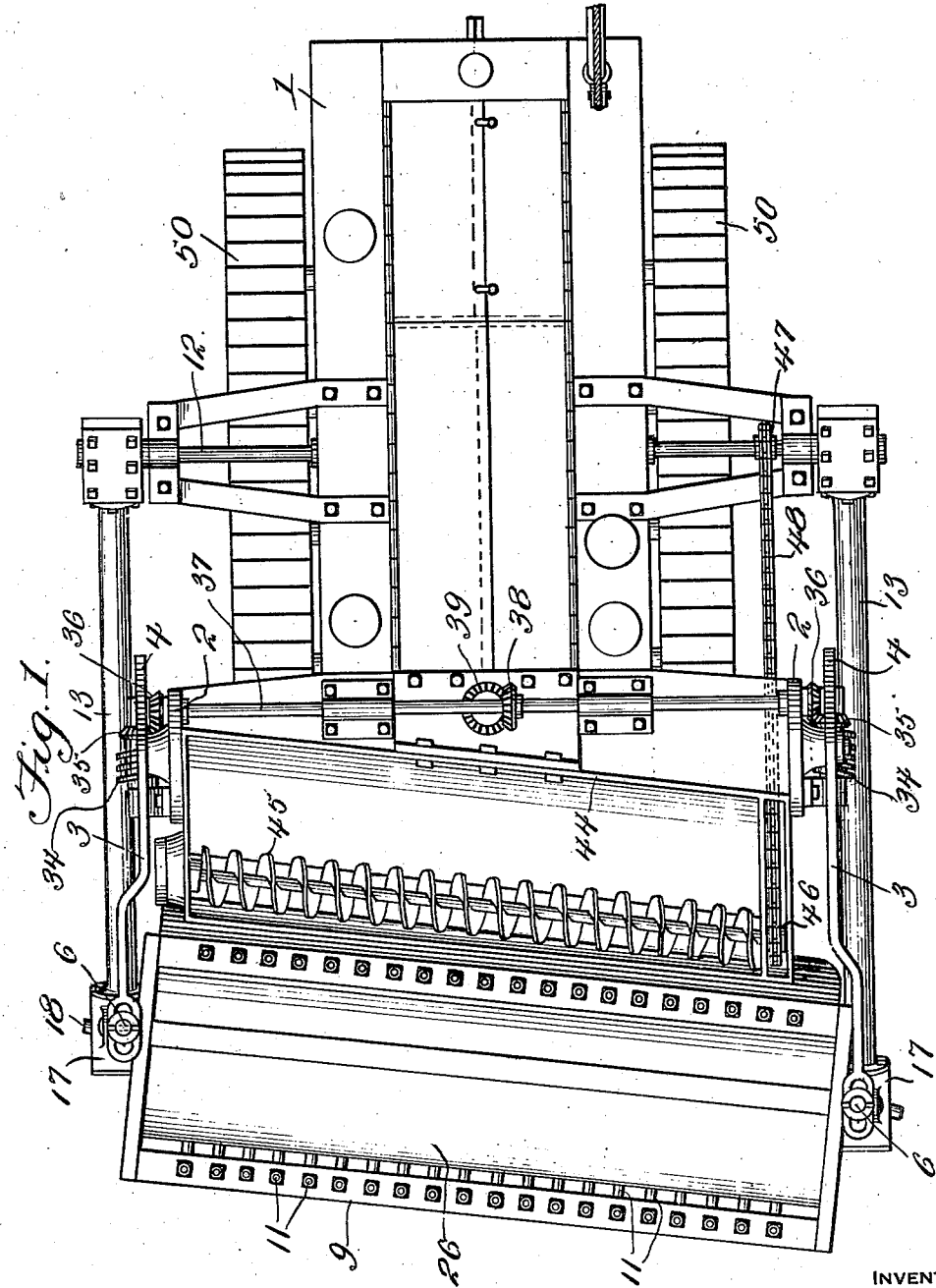

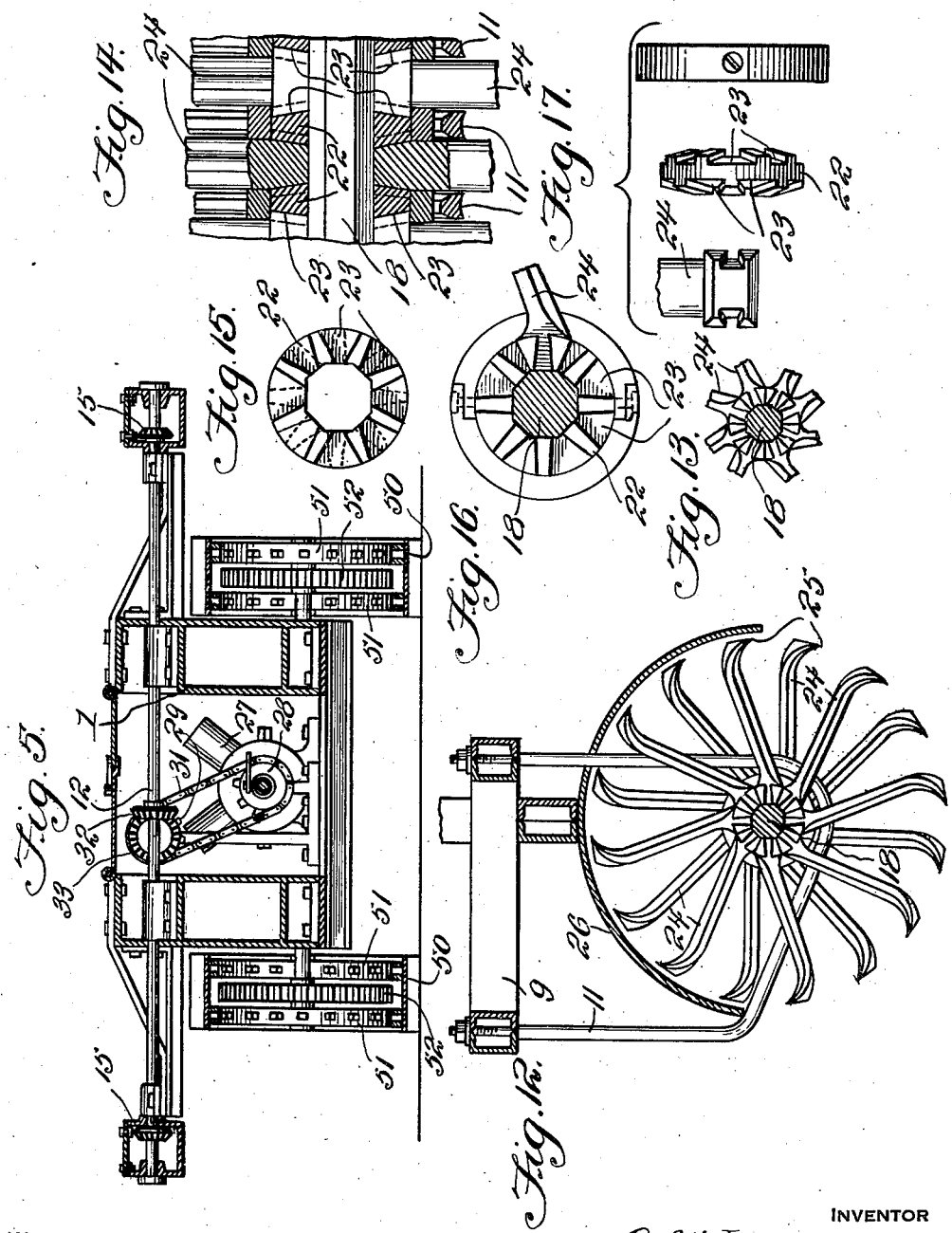

G. W. LUMM.
SOIL TILLER.
APPLICATION FILED APR. 27, 1918. RENEWED AUG. 4, 1919.
1,316,625.
Patented Sept. 23, 1919.
7 SHEETS—SHEET 5.
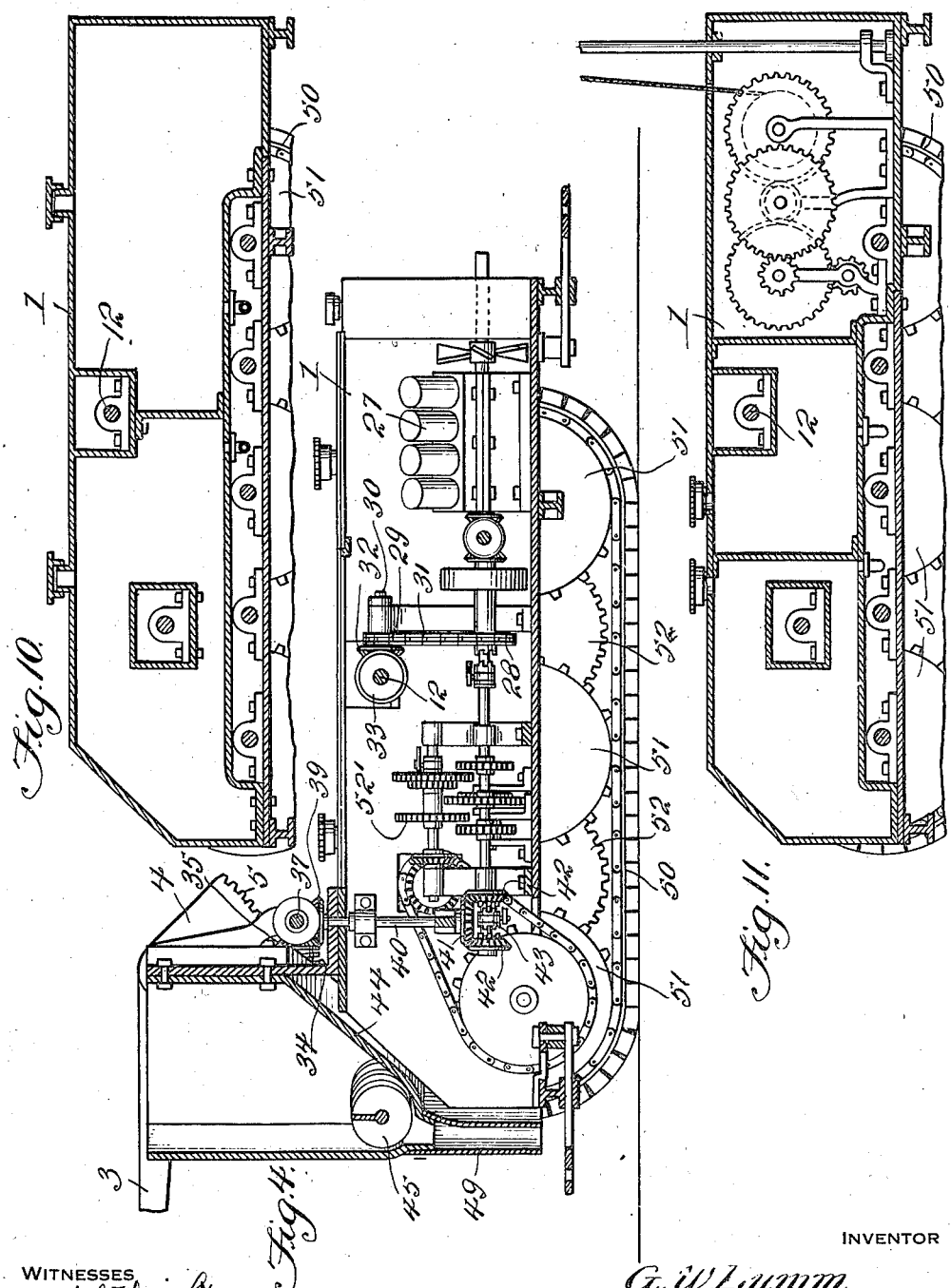
INVENTOR
G. W. Lumm
BY Victor J. Evans
ATTORNEY
WITNESSES

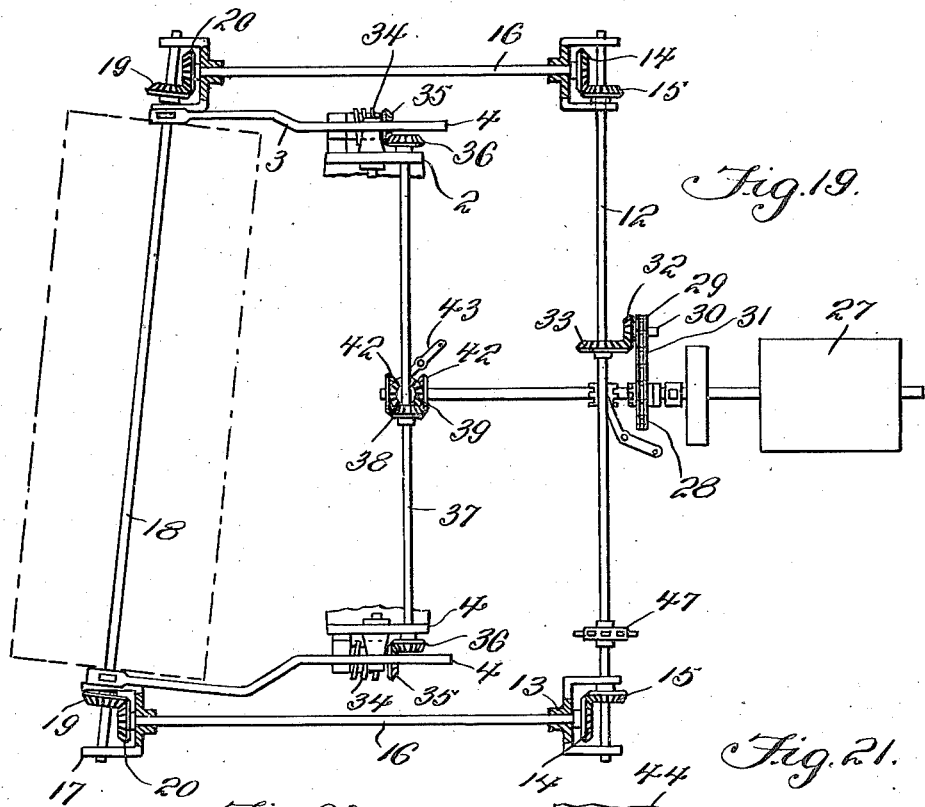
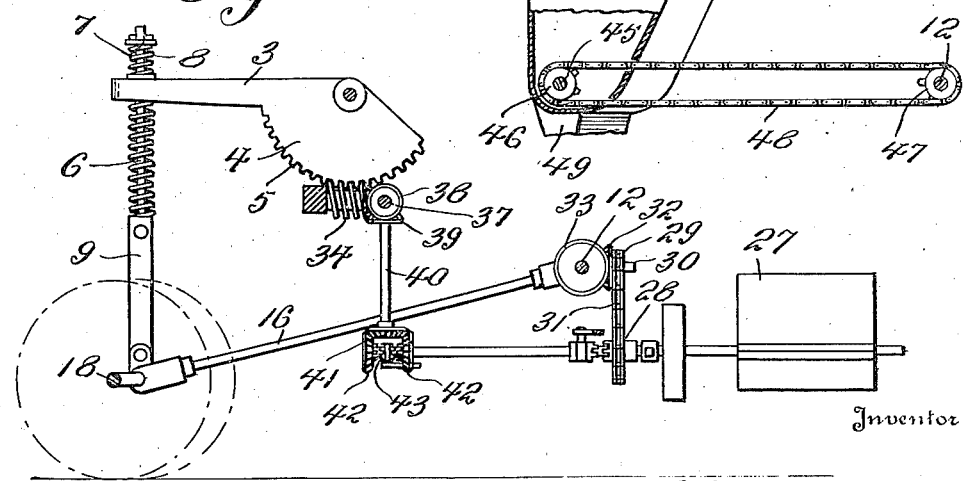

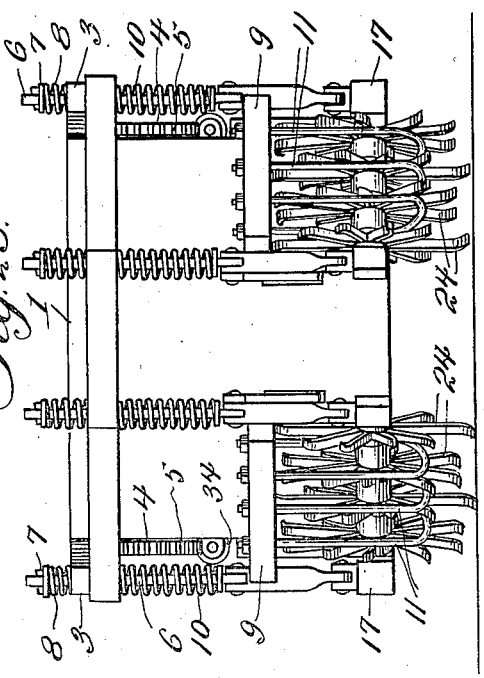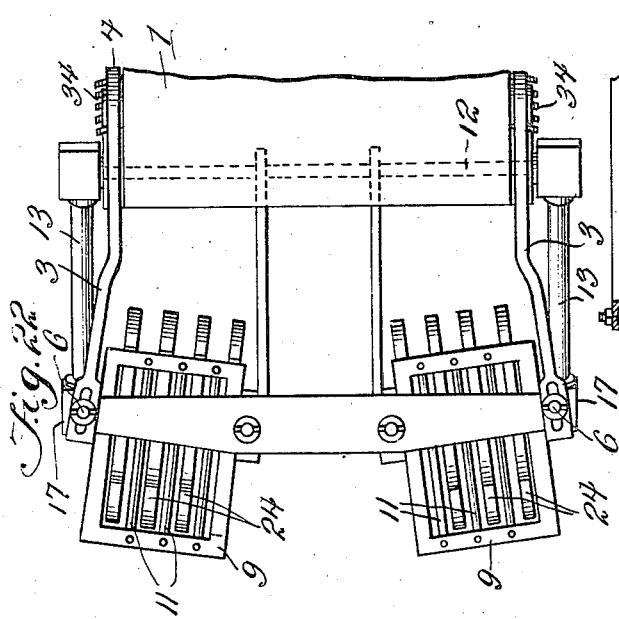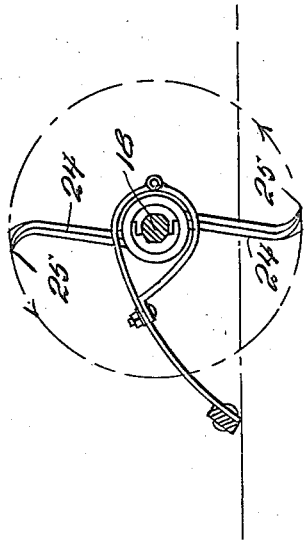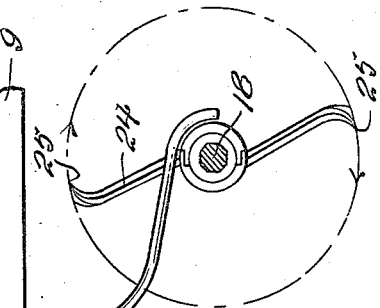

UNITED STATES PATENT OFFICE.

GEORGE W. LUMM, OF PONTIAC, MICHIGAN.

SOIL-TILLER.

1,316,625.  Specification of Letters Patent.  Patented Sept. 23, 1919.

Application filed April 27, 1918, Serial No. 231,183. Renewed August 4, 1919. Serial No. 315,316.

*To all whom it may concern:*

Be it known that I, GEORGE W. LUMM, a citizen of the United States, residing at Pontiac, in the county of Oakland and State of Michigan, have invented new and useful Improvements in Soil-Tillers, of which the following is a specification.

This invention relates to agricultural machines especially adapted to be used for tilling the soil and it consists in the novel features hereinafter described and claimed.

An object of the invention is to provide a tilling machine susceptible of attachment to a tractor of the caterpillar type and adapted to be operated from the engine which is used for propelling the tractor.

The invention also includes means for depositing fertilizer or compost upon the surface of the soil immediately in front of the soil engaging element or elements which turn or stir the same and consequently the fertilizer is applied approximately at the same time that the soil is tilled. The said fertilizer dropper is also operated from the engine which is used for propelling the tractor.

The soil tiller comprises a shaft which is journaled in a position upon the frame of the tractor and extends transversely thereof, there being means for rotating or operating the said shaft from the propelling engine of the tractor. Hollow arms are pivotally mounted at the end portions of the said shaft and other shafts are journaled in the said arms. Means are provided for operatively connecting the last mentioned shafts with the first mentioned shaft.

Standards are mounted upon the frame of the tractor and means operated from the engine of the tractor are provided for swinging the said arms. One of the last mentioned arms is longer than the other, both of the said arms having their free ends rearwardly disposed. A frame is resiliently supported at the rear ends of the last mentioned arms and carries a series of approximately U-shaped members. An axle is journaled in boxes which are carried at the rear ends of the first mentioned arms and the said boxes are pivotally connected with the last mentioned frame. Means are provided for rotating the axle from the shafts which are located in the tubular arms. The said axle carries several series of soil engaging elements or fingers and these fingers are longitudinally curved and disposed approximately radially with relation to the axis of the axle. The said U-shaped members above referred to are located in the spaces between the set of soil engaging elements and the intermediate portions of the U-shaped members extend under the axle. The said U-shaped members serve to prevent trash from accumulating between the several sets of soil engaging elements.

In the accompanying drawing:—

Figure 1 is a top plan view of the soil tiller.

Fig. 2 is a side elevation of the same.

Fig. 3 is a detailed plan view of the tractor to which the tiller is applied showing parts removed and parts in section.

Fig. 4 is a longitudinal sectional view of the tractor showing the fertilizer dropper applied and in section.

Fig. 5 is a transverse sectional view of the same cut on the line 5—5 of Fig. 3.

Figs. 6, 7 and 8 are detailed sectional views of transmission mechanism used upon the tractor.

Fig. 9 is a detailed longitudinal sectional view of one of the tubular arms and adjacent parts.

Fig. 10 is a side elevation of the upper portion of the tractor with parts in section.

Fig. 11 is a similar view indicating a derrick mounted on the tractor.

Fig. 12 is an end view of the soil tiller.

Figs. 13, 14, 15, 16 and 17 are detailed views of the soil tiller.

Fig. 18 is a detailed view of the derrick.

Fig. 19 is a diagrammatic view of the tiller.

Fig. 20 is a similar side elevation of the same.

Fig. 21 is a detailed view of the lower portion of the fertilizer dropper.

Fig. 22 is a top plan view showing the parts arranged as a cultivator.

Fig. 23 is a rear view of the same.

Figs. 24 and 25 are side views of modified forms of cleaners showing parts in section.

The tractor includes a frame 1 upon the rear portion of which is mounted standards 2. The standards are located at the opposite side portions of the said frame. Arms 3 are pivotally mounted at the upper portions of the standards 2 and are provided with arcuate sections 4 having teeth 5. One of the said arms 3 is longer than the other and the free end portion of the said arms are rearwardly disposed with relation to the frame 1.

Rods 6 are slidably mounted through the rear end portions of the arms 3 and nuts 7 are screw-threaded upon the upper ends of the rods 6. Springs 8 are interposed between the lower faces of the nuts 7 and the upper surfaces of the arms 3 and serve to sustain the weight of the rods 6 and the part connected thereto. The lower ends of the rods 6 are pivotally connected with the end portions of a frame 9 and springs 10 are interposed between the said frame 9 and the lower surfaces of the arms 3 and serve to normally hold the frame 9 at a lowered position with relation to the arms. U-shaped members 11 are carried by the frame 9.

A shaft 12 is disposed transversely across the frame 1 and journaled thereon. Means hereinafter described are provided for rotating the shaft 12. Tubular arms 13 are pivotally mounted at their forward ends upon the end portions of the shaft 12 and carry beveled pinions 14 which mesh with similar pinions 15 mounted upon the shaft 12. Shafts 16 are journaled in the arms 13 and the pinions 14 are fixed to the said shafts 16. The arms 13 are provided at their lower rear ends with boxes 17 which are pivotally connected with the frame 9 as best shown in Fig. 2 of the drawing. An axle 18 is journaled in the boxes 17 and carries at its ends beveled pinions 19 which mesh with similar pinions 20 mounted at the rear ends of the shafts 16. The intermediate portion of the shaft 18 is provided with oxygonal opposed surfaces as best indicated in Figs. 14, 15 and 16 and disks 22 are mounted at spaced intervals upon the shaft 18 and are provided at their sides with grooves 23. Fingers 24 are seated at their inner ends in the grooves 23 and their inner surfaces abut against the faces of the oxygonal portion of the shaft 18. The said fingers 24 are curved longitudinally and are disposed approximately radially with relation to the axes of the axle 18 and the outer ends of the fingers 24 are provided with chisel cutting edges 25. The fingers 24 are therefore arranged in spaced sets and the intermediate portions of the U-shaped members 11 lie in the spaces between the sets of fingers 24. The intermediate portions of the said members 11 also extend under the axle 18. The frame 9 carries a shield 26 which extends over the axle 18 and over the fingers 24 which are above the center of the said axle and the said shield serves to prevent objects or material from coming in contact with the said fingers as the fingers pass over the center of the axle.

As the machine moves over the surface of the soil and when the shaft 12 is rotated rotary movement is transmitted to the shafts 16 which in turn rotate the axle 18 and inasmuch as the lower fingers 24 are in contact with the soil they are moved through the soil and consequently the tilling operation is accomplished. The location of the lower portion of the U-shaped members 11 between the said fingers 24 prevent material from accumulating between the sets of fingers. When the arms 3 are swung in an upward direction the rods 6 lift the frame 9. At the same time the rear portions of the arms 13 are swung in an upward direction. Thus the fingers may be lifted to pass over obstructions and when it is desired to turn the machine around in a field.

By reason of the presence of the springs 8 and 10 the frame 9 is resiliently supported with relation to the arms 3 and consequently the fingers 24 may readily pass over minor obstructions without causing the arms 3 to swing vertically. By reason of the fact that the arms 3 are of different lengths the frame 11 is held at an acute angle with relation to the line of draft of the machine and the axle 18 is similarly positioned and consequently the tilling operation in the soil takes place in a line at an angle to the line of draft and this has a tendency to eliminate side strain or draft in view of the fact that the fingers are beveled at their ends which have contact with the soil at the same time.

An engine 27 is mounted upon the frame 1 and as hereinafter described may be used for propelling the tractor. A sprocket wheel 28 is mounted upon the shaft of the engine 27 and a sprocket wheel 29 is mounted upon a stub shaft 30 journaled upon the frame 1. A sprocket chain 31 is trained around the sprocket wheels 28 and 29 and is adapted to transmit rotary movement from the engine shaft to the wheel 29. A beveled pinion 32 is fixed to the sprocket wheel 29 and made a part thereof and meshes with a similar pinion 33 mounted upon the shaft 22 hereinbefore described. Thus means are provided for rotating the shaft 12 from the shaft of the engine 27.

Worms 34 are journaled upon the frame 1 and mesh with the teeth 5 of the arcuate sections of the arms 3. Beveled pinions 35 are fixed to the worms 34 and mesh with similar pinions 36 mounted upon a shaft 37 which in turn is journaled upon the frame 1. A beveled pinion 38 is mounted upon the intermediate portion of the shaft 37 and meshes with a beveled pinion 39 mounted upon a vertical shaft 40 mounted upon the frame 1. A beveled pinion 41 is carried at the lower end of the shaft 40 and meshes with two beveled pinions 42 loosely mounted upon the shaft of the engine 27. A clutch 43 is located on the shaft of the engine 27 between the pinions 42 and may be moved into engagement with either of the said pinions 42. The pinions 42 engage the pinion 41 at the opposite sides thereof. Therefore when the clutch member 43 is moved into engagement with one of the pinions 42 the said pinion is fixed with relation to the shaft of the engine 27 and the shaft 41 is turned in one direction. When the clutch member is moved into engagement with the other pinion 42 the shaft 40 is turned in an opposite direction. Through the intermeshing pinions 39 and 38 rotary movement is transmitted to the shaft 37 which through the pinions 36 and 35 rotate the worms 34 and inasmuch as the said worms engage the teeth 5 of the sections 4 of the arms 3 the said arms are swung. It is of course understood that the arms 3 are swung in an upward direction when the shaft 4 is turned in one direction and the arms 3 are swung in a downward direction when the shaft 4 is swung in an opposite direction. Consequently a power operated means is provided for raising and lowering the soil engaging elements and for raising and lowering the rear portions of the tubular arms 13.

A hopper 44 is mounted upon the frame 1 and is adapted to receive fertilizer or compost and a worm conveyer 45 is journaled in the lower portion of the said hopper. A sprocket wheel 46 is fixed to the end of the shaft of the worm 45 and a sprocket wheel 47 is mounted upon the shaft 12. A sprocket chain 48 is trained around the sprocket wheels 26 and 47 and is adapted to transmit rotary movement from the shaft 12 to the worm 45, consequently when the shaft 12 is rotating the said worm is turning and the material which is in the hopper 44 is cut and permitted to gravitate therefrom through a chute 49 and deposit upon the surface of the soil in advance of the fingers 24 which subsequently engage the soil and till the same. Therefore approximately at the same time the soil is tilled the fertilizer is applied and the two operations are accomplished substantially simultaneously.

As hereinbefore stated the tractor is of the caterpillar type and its belts 50 are driven by sprocket wheels 51 and gears 52 which in turn are operatively connected with transmission devices of gearings 52' which in turn may be operated from the shaft of the engine 4 in the usual manner to move the tractor forward at different rates of speed or to move the tractor rearwardly at a predetermined rate of speed.

Having described the invention what is claimed is:—

1. A tiller comprising a frame, a shaft journaled thereon, means for rotating the shaft, tubular arms pivotally connected with the shaft, drive shafts journaled in the tubular arms and operatively connected with the first mentioned shaft, said tubular arms being of different lengths, an axle journaled in the free end portions of the tubular arms, means operatively connecting the drive shaft with the axle, and soil engaging elements carried by the axle.

2. A tiller comprising a frame, a shaft journaled thereon, means for rotating the shaft, tubular arms pivoted upon the shaft, drive shafts journaled in the arms and operatively connected with the first mentioned shaft, an axle journaled in the arms and operatively connected with the shafts carried by the arms, means for raising the axle and the rear portions of the arms and fenders carried by said means for preventing material from accumulating upon the soil engaging elements.

3. A tiller comprising a frame, a shaft journaled thereon, means for rotating the shaft, tubular arms pivoted upon the shaft, other shafts journaled in the arms and operatively connected with the first mentioned shaft, an axle journaled in the arms and operatively connected with the shafts located therein, soil engaging elements carried by the axle, other arms pivoted upon the frame, means for swinging the last mentioned arms, a frame connected with the last mentioned arms, and U-shaped members carried by the frame and extending under the axle and lying in the spaces between the soil engaging elements.

4. A tiller comprising a frame, a shaft journaled thereon, means for rotating the shaft, tubular arms pivoted upon the shaft, other shafts journaled in the said tubular arms and operatively connected with the first mentioned shaft, an axle journaled in the tubular arms and operatively connected with the shafts located therein, soil engaging elements carried by the axle, other arms pivoted upon the frame, means for swinging the last mentioned arms, a second frame connected with the last mentioned arms, springs interposed between the second mentioned frame and the second mentioned arms, and U-shaped members carried by the last mentioned frame and extending under the axle and lying in the spaces between the soil engaging elements.

In testimony whereof I affix my signature.

GEORGE W. LUMM.